(12) United States Patent
Tong et al.

(10) Patent No.: US 7,235,760 B2
(45) Date of Patent: Jun. 26, 2007

(54) AC PULSE ARC WELDING METHOD

(75) Inventors: Hongjun Tong, Osaka (JP); Michitaka Todo, Osaka (JP)

(73) Assignee: Diahen Corporation, Osaka (JP)

( * ) Notice: Subject to any disclaimer, the term of this patent is extended or adjusted under 35 U.S.C. 154(b) by 237 days.

(21) Appl. No.: 11/155,645

(22) Filed: Jun. 17, 2005

(65) Prior Publication Data
US 2005/0284854 A1   Dec. 29, 2005

(30) Foreign Application Priority Data
Jun. 23, 2004   (JP) ............................... 2004-184532

(51) Int. Cl.
*B23K 9/09* (2006.01)
(52) U.S. Cl. ................................................ 219/130.51
(58) Field of Classification Search ........... 219/130.51, 219/137.71, 137 PS
See application file for complete search history.

(56) References Cited

U.S. PATENT DOCUMENTS 5,990,445 A * 11/1999 Ogasawara et al. .... 219/130.51
6,376,802 B1 * 4/2002 Tong et al. ............ 219/137 PS
6,600,135 B2 * 7/2003 Tong ..................... 219/137 PS

FOREIGN PATENT DOCUMENTS

JP           5-92269         4/1993

* cited by examiner

*Primary Examiner*—Clifford C. Shaw
(74) *Attorney, Agent, or Firm*—Hamre, Schumann, Mueller & Larson, P.C.

(57) ABSTRACT

In accordance with an AC pulse arc welding method, a periodic welding current is applied, that includes, for a pulse cycle, negative current in electrode negative polarity and positive current in electrode positive polarity. Then, a negative current rate is set by a negative current rate setting value, where the negative current rate represents the ratio of the negative current to the welding current for the pulse cycle. Then, a feeding speed of welding wire as a consumable electrode is set by a feeding speed setting value. The method further includes: setting an average of the welding current by a welding current setting value; and performing automatic calculation of the feeding speed setting value by using a predetermined conversion function based on input of the welding current setting value and the negative current rate setting value.

6 Claims, 11 Drawing Sheets

Electrode negative current rate settign value Rs(%)

AC PULSE ARC WELDING METHOD

BACKGROUND OF THE INVENTION

1. Field of the Invention

The present invention relates to an alternating current (AC) pulse arc welding method whereby the setting of welding conditions such as a wire feeding speed can be performed quickly and accurately.

2. Description of the Related Art

Figure 7:
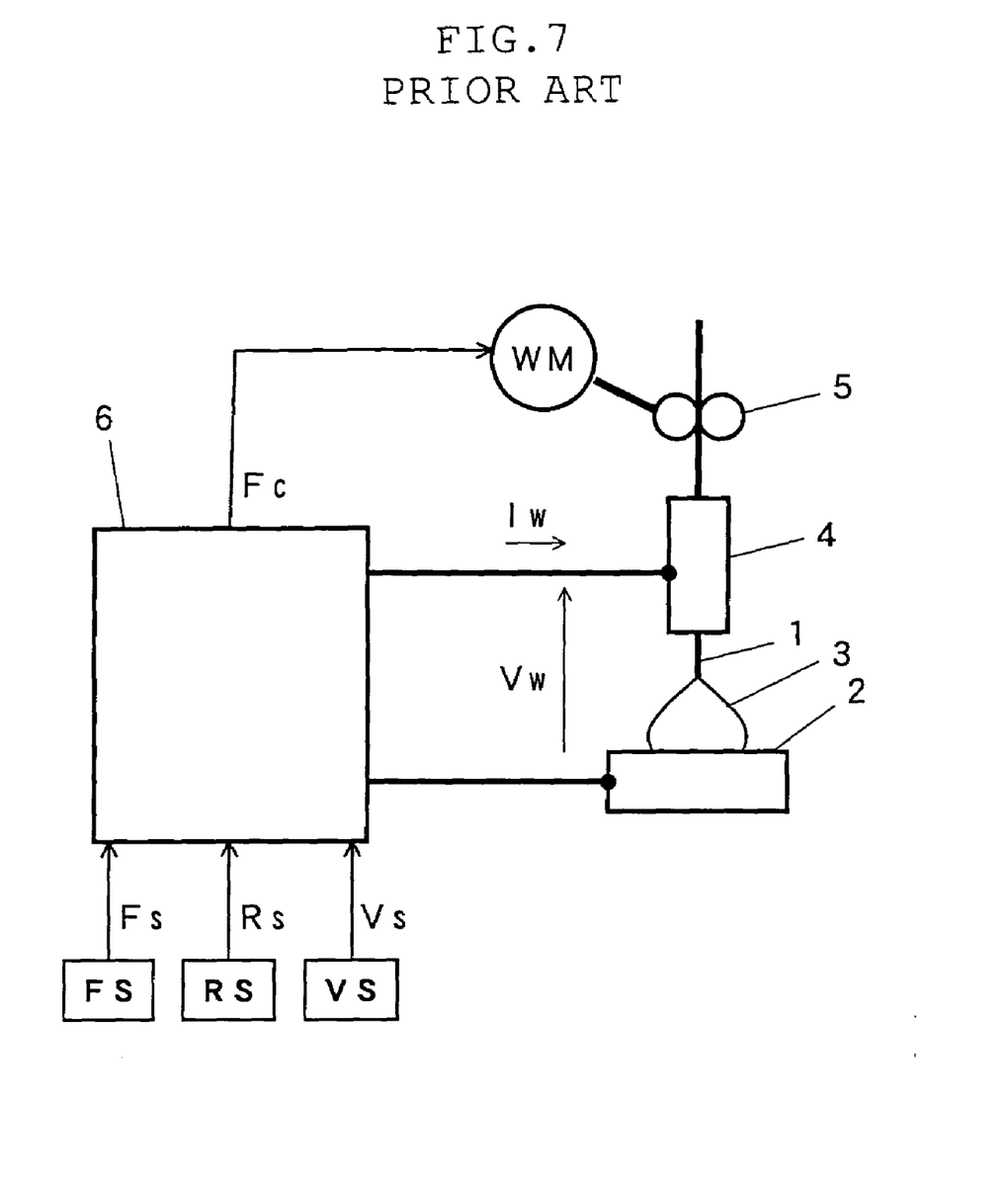
FIG. 7 illustrates a conventional AC pulse arc welder.

FIG. 7 illustrates a conventional AC pulse arc welder, which includes a wire feeding speed setting circuit FS, a negative current rate setting circuit RS, and a welding voltage setting circuit VS. The wire feeding speed setting circuit FS outputs a signal (wire feeding speed setting signal Fs) for setting the feeding speed of a welding wire 1. The negative current rate setting circuit RS outputs a signal (negative current rate setting signal Rs) for setting a negative current rate Ren to be described below with reference to FIG. 8. The welding voltage setting circuit VS outputs a signal (welding voltage setting signal Vs) for setting the average Vav of welding voltage Vw applied between the welding wire 1 and the base material (workpiece) 2.

The illustrated welder further includes a conventionally available power source 6, to which the above-mentioned setting signals Fs, Rs, and Vs are inputted. Based on these input signals, the power source 6 supplies welding current Iw and welding voltage Vw to be described below with reference to FIG. 8, while also supplying a wire feeding control signal Fc for controlling a wire feed motor WM.

The wire feed motor WM is connected to wire feed rollers 5. Upon actuation of the motor WM, the rollers 5 are rotated to feed the welding wire 1 through a welding torch 4. In welding operation, an electric arc 3 is generated between the welding wire 1 and the base material 2.

Figure 8:
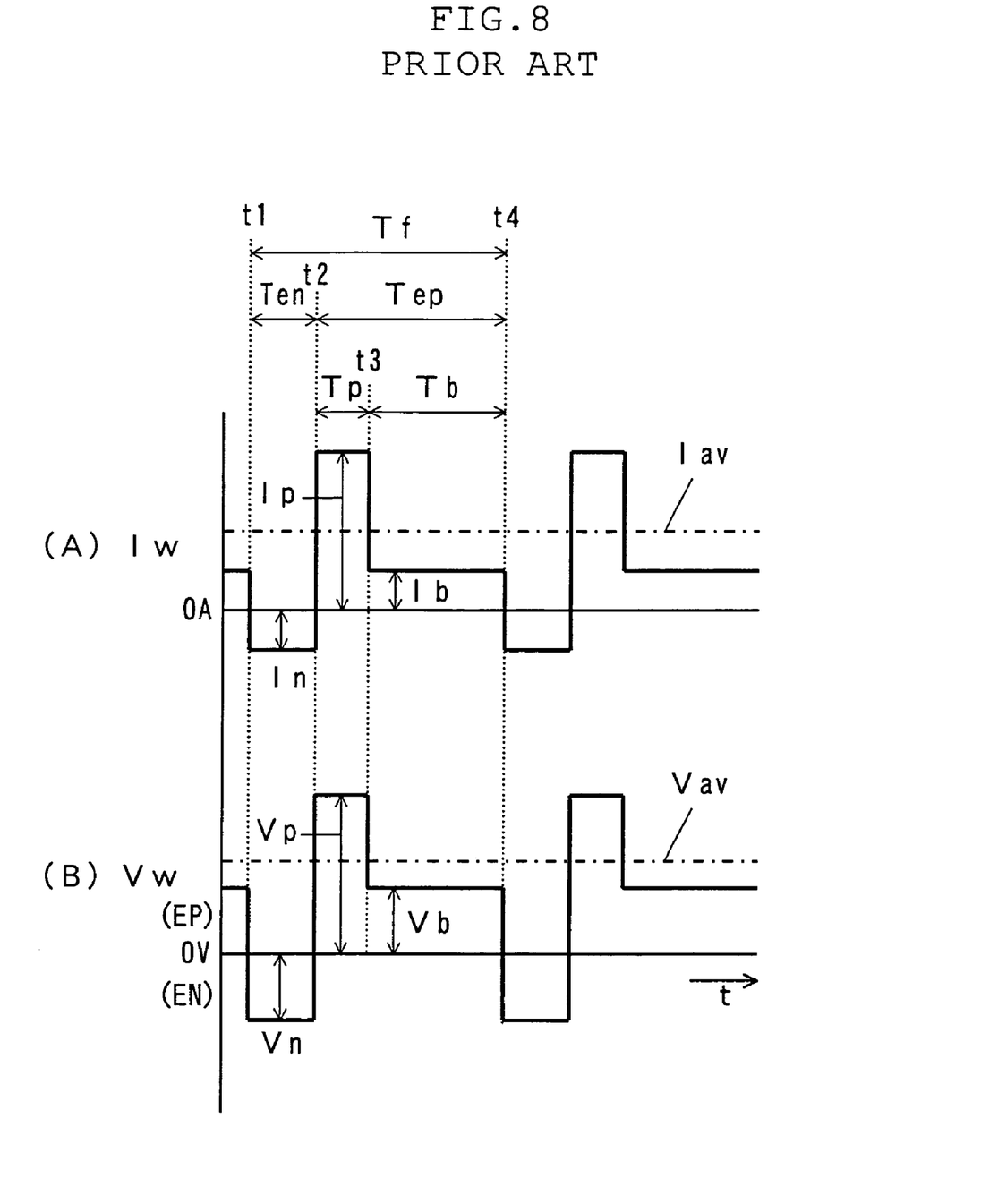
FIG. 8 illustrates current and voltage waveforms employed for the conventional welder.

FIG. 8 shows the waveforms of a welding current Iw and a welding voltage Vw applied for AC pulse arc welding processes. The period from time t1 to time t2 is an electrode negative period Ten, during which the power source 6 is in negative polarity (EN). Thus, in the period Ten, a negative current In shown in FIG. 8(A) passes through the circuit, and a negative voltage Vn shown in FIG. 8(B) is applied between the welding electrode (i.e., the welding wire 1) and the base material 2.

The period from time t2 to time t4 is an electrode positive period Tep, during which the power source 6 is in positive polarity (EP). Thus, in the period Tep, a positive current Iw shown in FIG. 8(A) passes through the circuit, and a negative voltage Vw shown in FIG. 8(B) is applied between the welding wire 1 and the base material 2.

The electrode positive period Tep can be divided into two shorter periods (sub-periods): a peak period Tp (from t2 to t3) and a base period Tb (from t3 to t4). In the peak period Tp, as seen from the waveforms (A) and (B) in FIG. 8, relatively greater peak current Ip and peak voltage Vp are applied for transferring tiny globules of molten metal from the welding wire 1 to the base material 2. In the base period Tb, on the other hand, relatively smaller base current Ib and base voltage Vb are applied for preventing the growth of the molten metal globules.

The waveforms shown in FIG. 8 are periodic, each having a predetermined cycle Tf (from t1 to t4). The current and voltage application is repeatedly performed for the required welding processes.

In FIG. 8(A), the single dot chain line represents a welding current average Iav, which is the average (time average) of the absolute value of the welding current Iw. Likewise, in FIG. 8(B), the single dot chain line represents a welding voltage average Vav, which is the average (time average) of the absolute value of the welding voltage Vw.

In the following description, the absolute value of the negative current In is denoted simply by In. (Likewise, the absolute value of the negative voltage Vn is denoted simply by Vn.) The negative current rate Ren (%) is defined as follows:

$$Ren = 100 \times Ten \times In / (Ten \times In + Tp \times Ip + Tb \times Ib)$$

In the above definition, "Ten×In" represents the time integration of the negative current In for the pulse cycle Tf, and "Ten×In+Tp×Ip+Tb×Ib" represents the time integration of the welding current Iw for the same cycle Tf. Thus, the rate Ren represents a ratio of the total amount of the negative current to the total amount of the welding current for the cycle Tf.

As mentioned above, the wire feeding speed setting signal Fs is used for setting the feeding speed of the welding wire 1. In direct current (DC) pulse arc welding processes, the wire feeding speed is proportional to the welding current average Iav. Thus, to set the welding current average Iav means to set the wire feeding speed. The situations of AC pulse arc welding will be described later with reference to FIG. 9.

The negative current rate setting signal Rs is used for setting the negative current rate Ren defined above. Specifically, the negative current rate setting signal Rs adjusts the length of the electrode negative period Ten and/or the value of the negative current In, thereby varying the negative current rate Ren.

The welding voltage setting signal Vs can alter the pulse cycle Tf and the peak period Tp, for example, by feedback control. Thus, based on the signal Vs, it is possible to vary the welding voltage average Vav.

Figure 9:
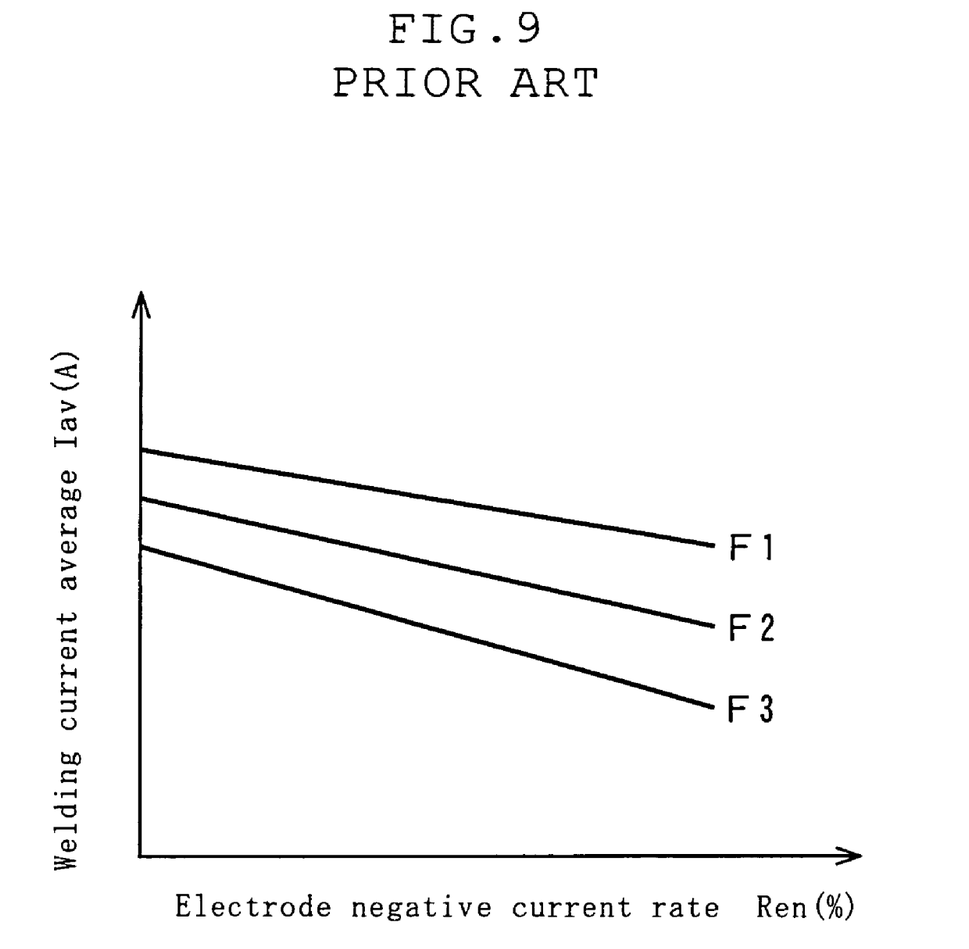
FIG. 9 illustrates the relationship between the negative current rate Ren and the welding current average Iav in the conventional welder.

FIG. 9 illustrates the relationship between the negative current rate Ren and the welding current average Iav, with the wire feeding speed kept constant. More specifically, the figure illustrates three cases where the wire feeding speed is set to F1, F2 and F3 (F1>F2>F3), and each graph shows, for the relevant one of the three speeds, how the welding current average Iav varies with the change of the negative current rate Ren. As seen from the figure, in the AC pulse arc welding, the welding current average Iav varies as the negative current rate Ren changes, even when the wire feeding speed is constant.

In general, the welding current average Iav is proportional to the heat input to the base material, and the wire feeding speed is proportional to the amount of deposition. When thin metallic plates are welded to each other by DC pulse arc welding, the thickness of the plates determines an appropriate welding current average, and hence the wire feeding speed. For instance, a thin plate to be welded necessitates a small welding current average Iav, and a low wire feeding speed. Unfavorably, it is difficult to form proper weld beads with a low wire feeding speed and a small amount of deposition. In particular, when there is a gap between the metallic parts to be welded, the shortage of deposition is crucial.

By AC pulse arc welding, on the other hand, the setting of the wire feeding speed can be performed independently, to some extent, of the setting of the welding current average Iav. Thus, the above-described problem can be overcome by the AC pulse arc welding. In this sense, AC pulse arc welding is advantageous for the welding of thin base materials. AC pulse arc welding is often employed for the welding of aluminum parts, but is applicable to ferrous materials.

The above-described prior art is disclosed in JP-A-H05-92269, for example.

As described above, in the AC pulse arc welding, the change in the negative current rate Ren leads to the change in the relationship between the wire feeding speed and the welding current average Iav, and this fact can be utilized for performing proper welding of thin plates. In welding thin plates, two important factors to be considered are penetration and gap allowance. A proper penetration is formed by proper heat input to the base material. Regarding the gap allowance, the adjustable range of deposition should be sufficiently wide. In light of these, it is required that the welding current average Iav is adjusted to optimize the heat input to the base material, and that the negative current rate Ren is adjusted to optimize the wire feeding speed for attaining proper amount of deposition.

Figure 10:
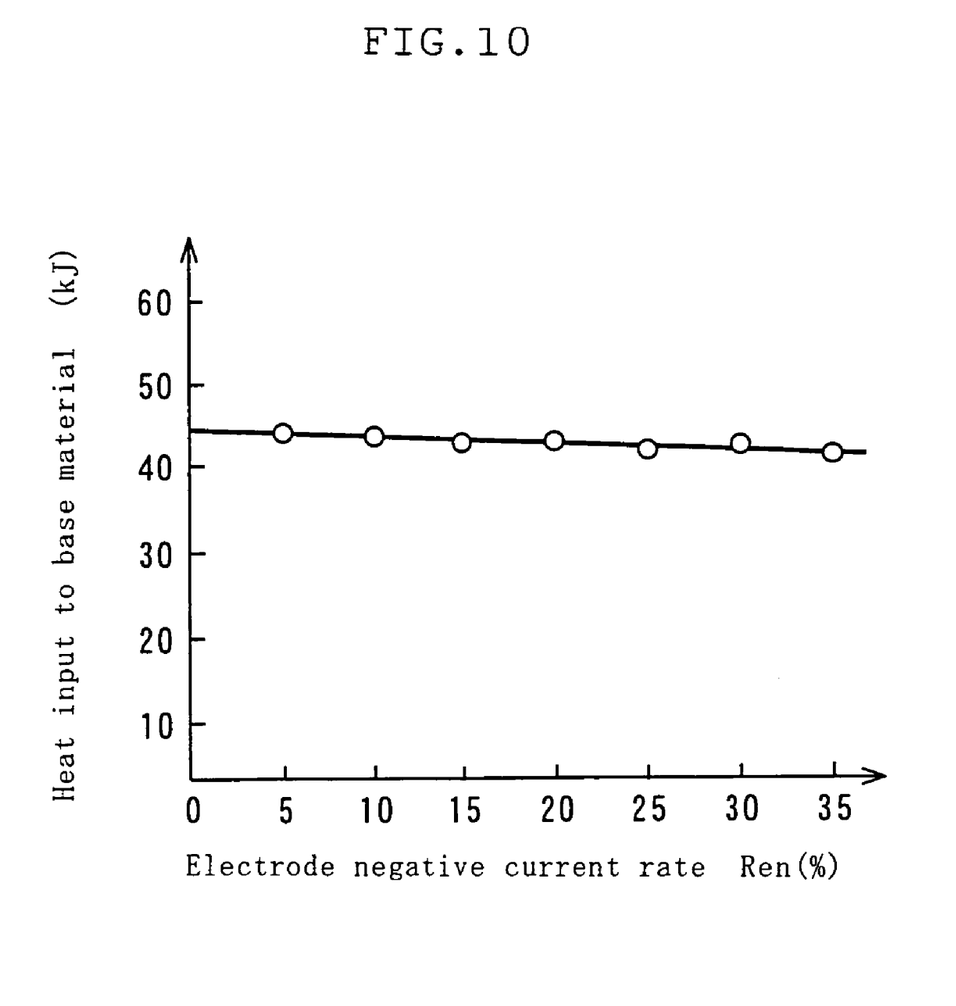
FIG. 10 is a graph for explaining the conventional problem, illustrating the relationship between the negative current rate Ren and the heat input to the base material, with the welding current average Iav kept constant.

FIG. 10 shows the relationship between the negative current rate Ren and the heat input to the base material, with the welding current average kept constant. The measurement of the heat input to the base material was conducted with the use of: a welding wire made of aluminum alloy A5356 and having a diameter of 1.2 mm; and a base material made of aluminum A052 and having a thickness of 4 mm. The AC pulse arc welding with respect to the base material was performed for 30 seconds, the welding speed was 60 cm/min, and the welding current average Iav was kept at 100 A. As shown in the figure, when the welding current average Iav is constant, the heat input to the base material is generally constant, while the negative current rate is not constant. Due to the constant heat input, the penetration of the welding into the base material is generally constant. In the illustrated measurement, the wire feeding speed was adjusted so that the welding current average Iav remained constant, even when the negative current rate Ren changed.

Figure 11:
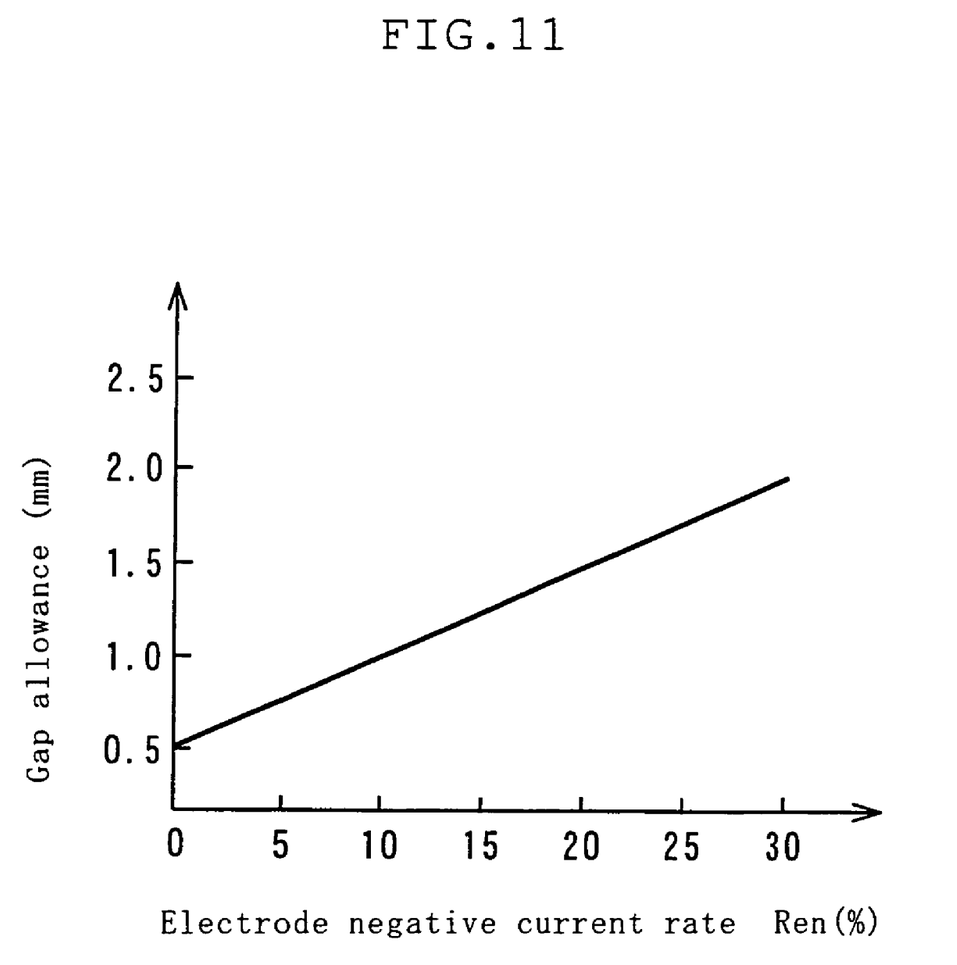
FIG. 11 is a graph for explaining the conventional problem, illustrating the relationship between the negative current rate Ren and the gap allowance, with the welding current average Iav kept constant.

FIG. 11 illustrates the relationship between the negative current rate Ren and the gap allowance of the base materials, with the welding current average kept constant. In the illustrated measurement, where lap welding was conducted, use was made of a welding wire having a diameter of 1.2 mm and made of aluminum alloy A5356. The base materials were plates having a thickness of 1.0 mm and made of aluminum alloy A5052. The welding speed was 60 cm/min, and the welding current average Iav was kept at 60 A. In the illustrated measurement, the maximum joint gap that allowed proper welding operation was determined. As shown in the figure, when the welding current average Iav was constant, the gap allowance becomes greater as the negative current rate Ren becomes greater. This is because, as the negative current rate Ren increases, the wire feeding speed becomes faster, and therefore the amount of deposition becomes greater. Accordingly, even a wide gap can be filled with a greater amount of molten metal. In this manner, a wide gap in the metallic parts to be connected can be filled by increasing the negative current rate Ren.

As seen from the above explanation with reference to FIGS. 10 and 11, the following is concluded. Proper heat input is determined by the thickness of base materials, the type of the joint, etc, and once the heat input is determined, a proper welding current average Iav is determined. At the same time, a proper wire feeding speed is determined by the gap at the joint, and the wire feeding speed in turn determines a proper negative current rate Ren. In summary, once the thickness of the base materials, the type of the joint, and the gap are determined, proper welding current average Iav and negative current rate Ren are determined.

In the conventional welding processes, as noted above with reference to FIG. 7, the wire feeding speed and the negative current rate Ren are to be set for performing welding. In the conventional manner, however, when the wire feeding speed setting signal Fs is adjusted for setting the welding current average Iav, the negative current rate Ren will inevitably change. Further, when the negative current rate setting signal Rs is adjusted, not only the negative current rate Ren but also the welding current average Iav will change. Namely, in the conventional welding system, the desired setting parameters (i.e., the welding current average Iav and the negative current rate Ren) fail to correspond to the actual setting parameters (i.e., the wire feeding speed and the negative current rate Ren) in a one-to-one relationship. As a result, the setting procedure becomes complicated, as noted above, and thereby taking much time. Further, the human operator needs to fully understand the above-described characteristics for conducting the setting procedure properly. This means that the human operator is required to have much experience and acquire the skill for conducting desired settings.

SUMMARY OF THE INVENTION

The present invention has been proposed under the circumstances described above. It is therefore an object of the present invention to provide an AC pulse arc welding method whereby the setting of the welding current average and the setting of the electrode negative current rate can be conducted quickly and accurately with ease.

According to the present invention, there is provided an AC pulse arc welding method comprising: applying a periodic welding current that includes, for a pulse cycle, negative current in electrode negative polarity and positive current in electrode positive polarity; setting a negative current rate by a negative current rate setting value, the negative current rate representing a ratio of the negative current to the welding current for the pulse cycle; and setting a feeding speed of welding wire as a consumable electrode by a feeding speed setting value. Further, the method comprises: setting an average of the welding current by a welding current setting value; and performing automatic calculation of the feeding speed setting value by using a predetermined conversion function based on input of the welding current setting value and the negative current rate setting value.

Preferably, the negative current rate may be a ratio of time integration of the negative current to time integration of the welding current for the one pulse cycle.

Preferably, the positive current for the one pulse cycle may comprise peak current and base current.

Preferably, the conversion function may comprise a group of functions corresponding to different negative current setting values, respectively. Each function belonging to the group may define a relationship between welding current setting values and feeding speed setting values for a relevant one of the negative current setting values.

Preferably, the AC pulse arc welding method of the present invention may further comprise the step of setting an average voltage applied between the welding wire and a base metal by a welding voltage setting value. In this instance, the welding voltage setting value may be automatically calculated by a predetermined voltage setting function upon input of the welding current setting value.

According to the present invention, the welding current setting value Is determines the welding current average Iav, and the electrode negative current rate setting value Rs determines the electrode negative current rate Ren, and the wire feeding speed setting value Fsc is automatically calculated by a conversion function. In this manner, the setting of the welding current average Iav can be conducted independently of the setting of the negative current rate Ren. As a result, the setting of the heat input to the base material (this setting is for attaining proper penetration in the base material) can be easily conducted based on the welding current setting value Is. Further, the setting of the negative current rate Ren (this setting is for optimizing the amount of deposition in light of the gap between the base materials) can be easily conducted based on the negative current rate setting value Rs. Since the welding current average Iav and the negative current rate Ren can be set independently of each other, the human operator does not need much skill for using the welding system.

Other features and advantages of the present invention will become apparent from the detailed description given below with reference to the accompanying drawings.

DETAILED DESCRIPTION OF THE PREFERRED EMBODIMENTS

Preferred embodiments of the present invention will be described below with reference to the accompanying drawings.

Figure 1:
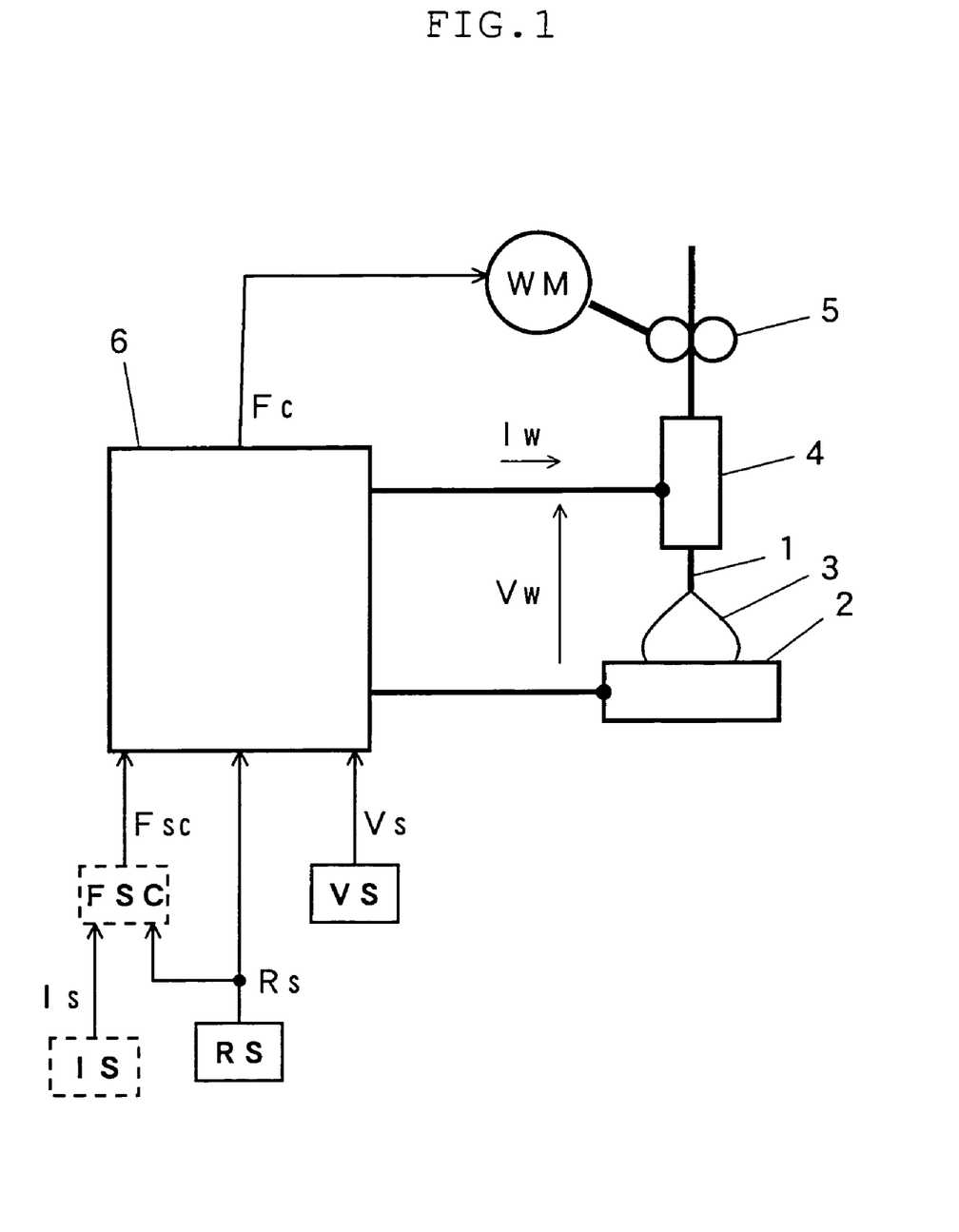
FIG. 1 illustrates an AC pulse arc welder used for implementing a welding method according to the present invention.

FIG. 1 shows an AC pulse arc welder used for implementing a welding method according to the present invention. In the figure, the elements identical or similar in function to those shown in FIG. 7 are designated by the same reference numerals or characters used in FIG. 7. Specifically, the elements represented in solid lines may be the same for both the conventional welder (FIG. 7) and the welder of the present invention (FIG. 1), while the elements represented in broken lines in FIG. 1 have no counterparts in the conventional system shown in FIG. 7.

As shown in FIG. 1, the welding current setting circuit IS outputs a welding current setting signal Is for setting a welding current average. The wire feeding speed conversion circuit FSC receives the above-mentioned welding current setting signal Is and an electrode negative current rate setting signal Rs. Based on the input of these signals, the conversion circuit FSC calculates a wire feeding speed setting signal Fsc by a predetermined conversion function or functions (to be described later), and then outputs the signal Fsc to the power source 6. The outputted signal Fsc in itself is the same as the conventional feeding speed setting signal Fs.

In addition to the signal Fsc, the power source 6 also receives a negative current rate setting signal Rs and a welding voltage setting signal Vs, as in the conventional welder. Thus, a conventionally available power source can be used as the power source 6 of the present invention. According to the present invention, the welding current setting circuit IS, the current rate setting circuit RS, the welding voltage setting circuit VS and the conversion circuit FSC may be incorporated in the power source 6 as one unit.

With the arrangements shown in FIG. 1, the setting of the welding current average and the setting of the negative current rate can be conducted independently of each other. Thus, the desired condition settings can be performed quickly and accurately with ease.

Figure 2:
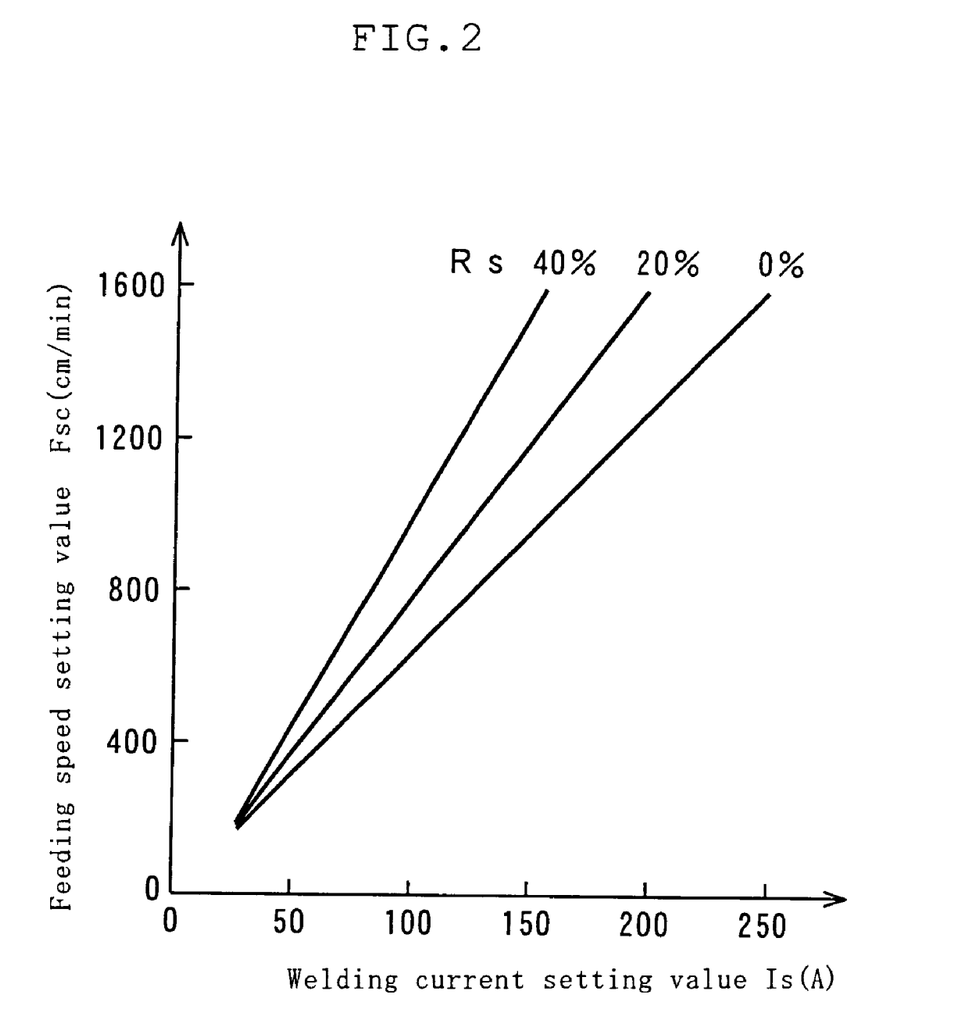
FIG. 2 illustrates some examples of conversion functions used for the welding method of the present invention.

FIG. 2 is a graph showing some examples of conversion functions mentioned above. Each conversion function describes the relationship between the welding current setting signal (or value) Is and the wire feeding speed setting signal (or value) Fsc for a constant negative current rate Rs (0%, 20%, 40%). In the illustrated embodiment, use is made of a welding wire having a diameter of 1.2 mm and made of aluminum alloy A5356. The function shown in FIG. 2 is expressed in the following formula:

$$Fsc = a \times Is + b \quad (1)$$

where "a" and "b" are parameters, which are variable depending on the electrode negative current rate setting signal (or value) Rs. In other words, the parameters "a" and "b" themselves are functions of Rs, expressed in the following formulas:

$$a = f1(Rs) \quad (2)$$

$$b = f2(Rs) \quad (3)$$

Consequently, Fsc is a function of two variables, i.e., Is and Rs, and therefore can be expressed as Fsc=F(Is, Rs)

Figure 3:
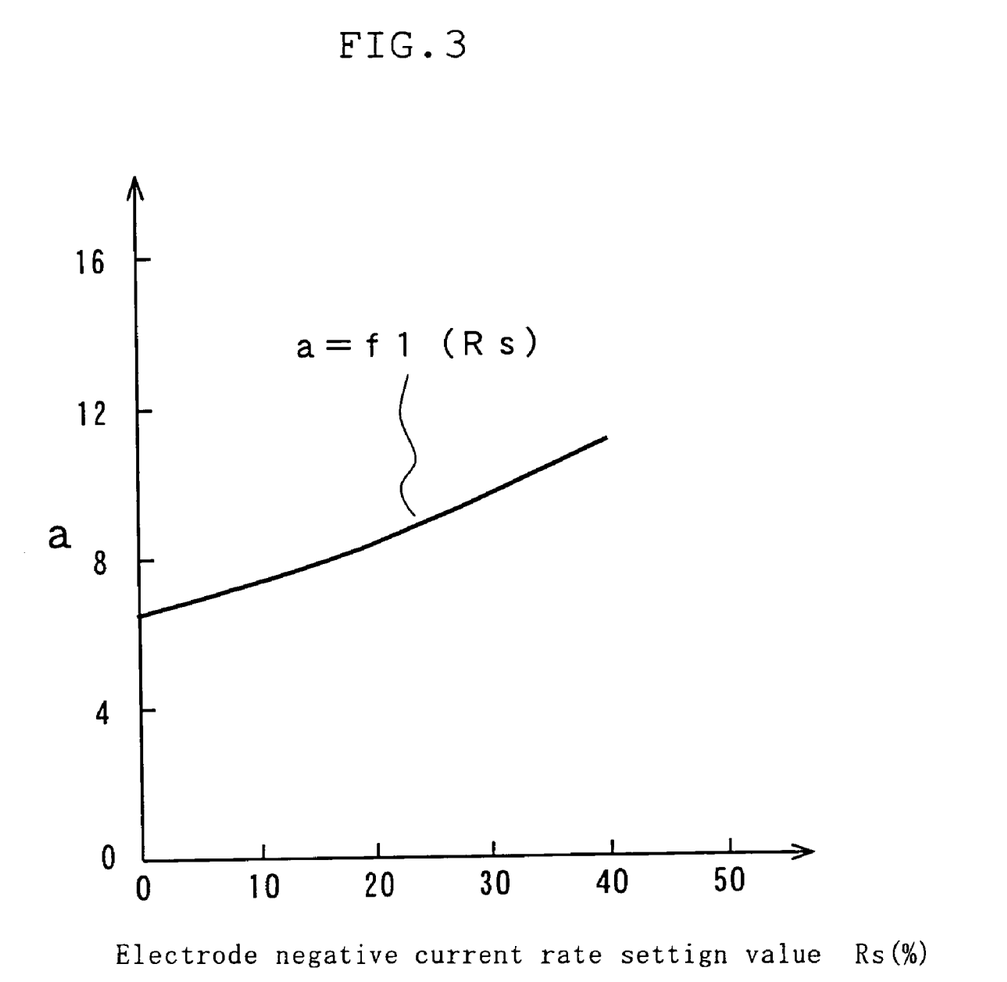
FIG. 3 illustrates an example of a function (f1) that determines a parameter "a" for the conversion function shown in FIG. 2.
Figure 4:
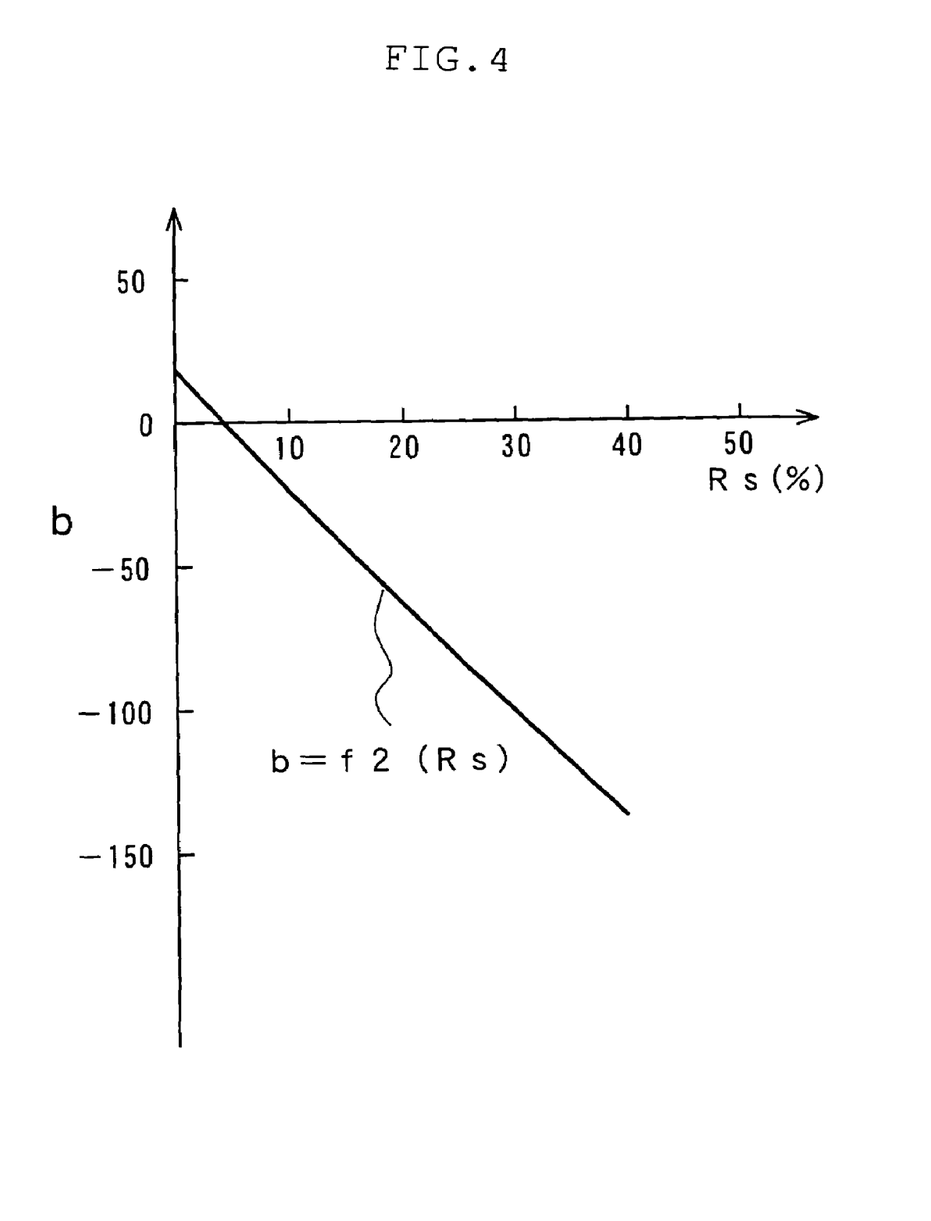
FIG. 4 illustrates an example of a function (f2) that determines a parameter "b" for the conversion function shown in FIG. 2.

An example of the function f1 in formula (2) is illustrated in FIG. 3, which describes the relationship between the negative current rate setting signal Rs and the first parameter "a." Likewise, an example of the function f2 in formula (3) is illustrated in FIG. 4, which describes the relationship between the negative current rate setting signal Rs and the second parameter "b."

The conversion function of the present invention may be defined in the following manner, which is discrete with respect to the negative current rate setting signal Rs:

$$Fsc = a0 \times Is + b0 \quad \text{for } Rs = 0\%$$
$$Fsc = a1 \times Is + b1 \quad \text{for } Rs = 1\%$$
$$Fsc = a2 \times Is + b3 \quad \text{for } Rs = 2\%$$
$$\ldots$$
$$Fsc = a40 \times Is + b40 \quad \text{for } Rs = 40\%$$

where a0, a1, a2, . . . , a40 and b0, b1, b2, . . . , b40 are all constant.

In this definition, a plurality of functions (sub-functions), each corresponding to the relevant one of the current rate setting signals Rs, are predetermined. The constants ai, bj (i, j=0-40) may be experimentally worked out. Practically, the range of the setting signal Rs may be 0 to 40%, as in the above example, though the present invention is not limited to this. Further, in the above example, the increment of Rs is one, though the present invention is not limited to this. For instance, the increment may be five, in which Rs=0%, 5%, 10%, and so on. In such a case, interpolation may be employed to work out a non-predetermined value of Fsc. As an example, Fsc for Rs=2%, denoted as Fsc(2%), can be calculated by using the two adjacent values Fsc(0%) and Fsc(5%) through a formula F (2%)=3/5×Fsc(0%)+2/5×Fsc(5%).

Figure 5:
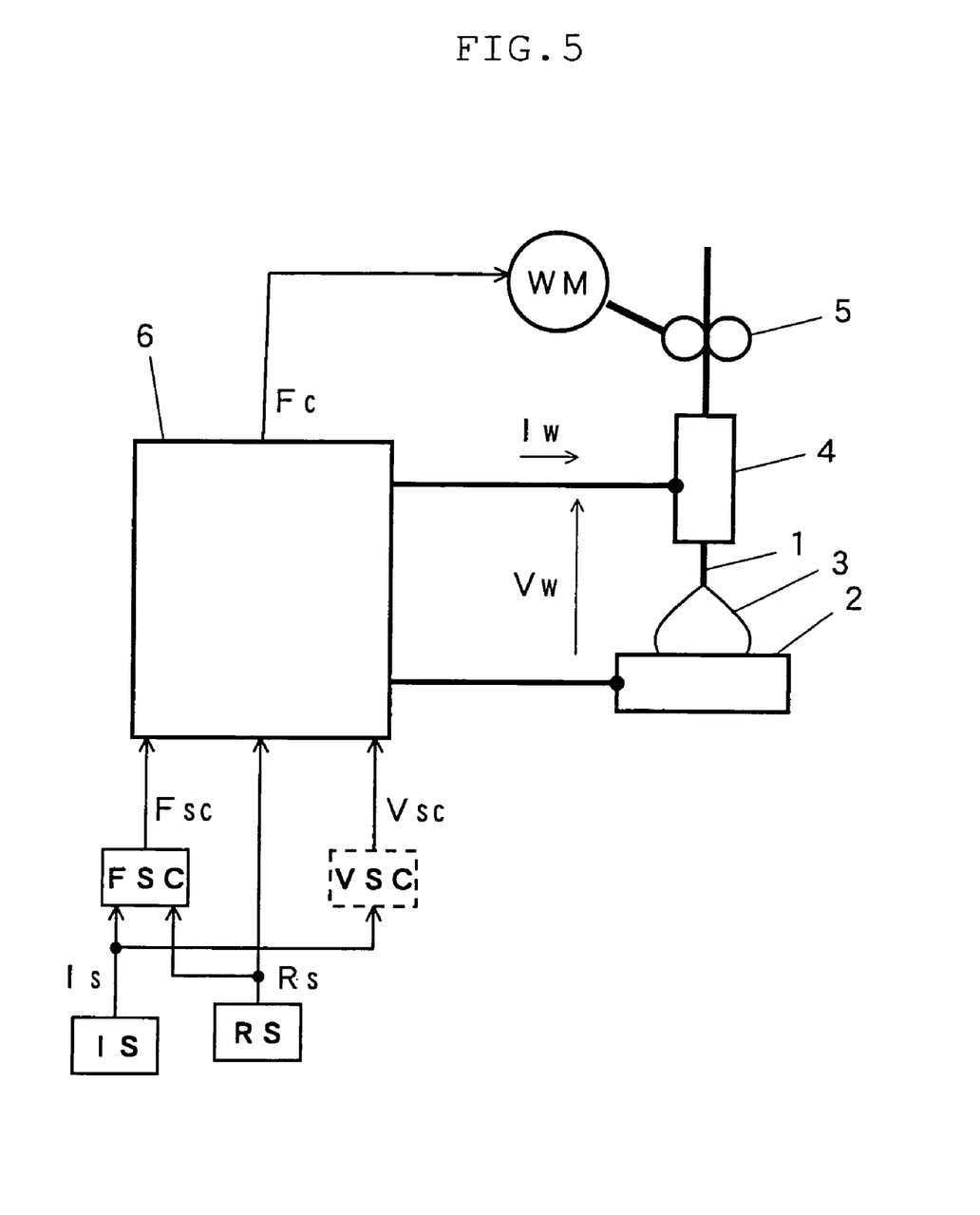
FIG. 5 illustrates another AC pulse arc welder used for implementing the welding method according to the present invention.

FIG. 5 illustrates a second example of an AC pulse arc welder used for implementing a welding method of the present invention. The elements represented in solid lines in FIG. 5 are the same as those shown in FIG. 1 denoted by the same reference numerals or characters. The second welder shown in FIG. 5 is different from the first welder shown in FIG. 1 in comprising a one-variable, voltage function circuit VSC, represented in broken lines. Specifically, upon input of a welding current setting signal Is, the voltage function circuit VSC calculates a welding voltage setting signal Vsc by using a predetermined voltage function (to be described below). In this embodiment again, a conventionally available power source can be used as the power source 6, since the voltage setting signal Vsc in itself is the same as the voltage setting signal Vs shown in FIG. 1. The welding current setting circuit IS, the electrode negative current rate setting circuit RS, the wire feeding speed conversion circuit FSC, and the voltage function circuit VSC may be incorporated in the power source 6 as one unit.

In general, an appropriate welding voltage average Vav (welding voltage setting signal Vsc) for the welding current average Iav (welding current setting signal Is) depends on the diameter and the material of the welding wire to be used. The above-mentioned voltage function describes the relationship between Is and Vsc.

Figure 6:
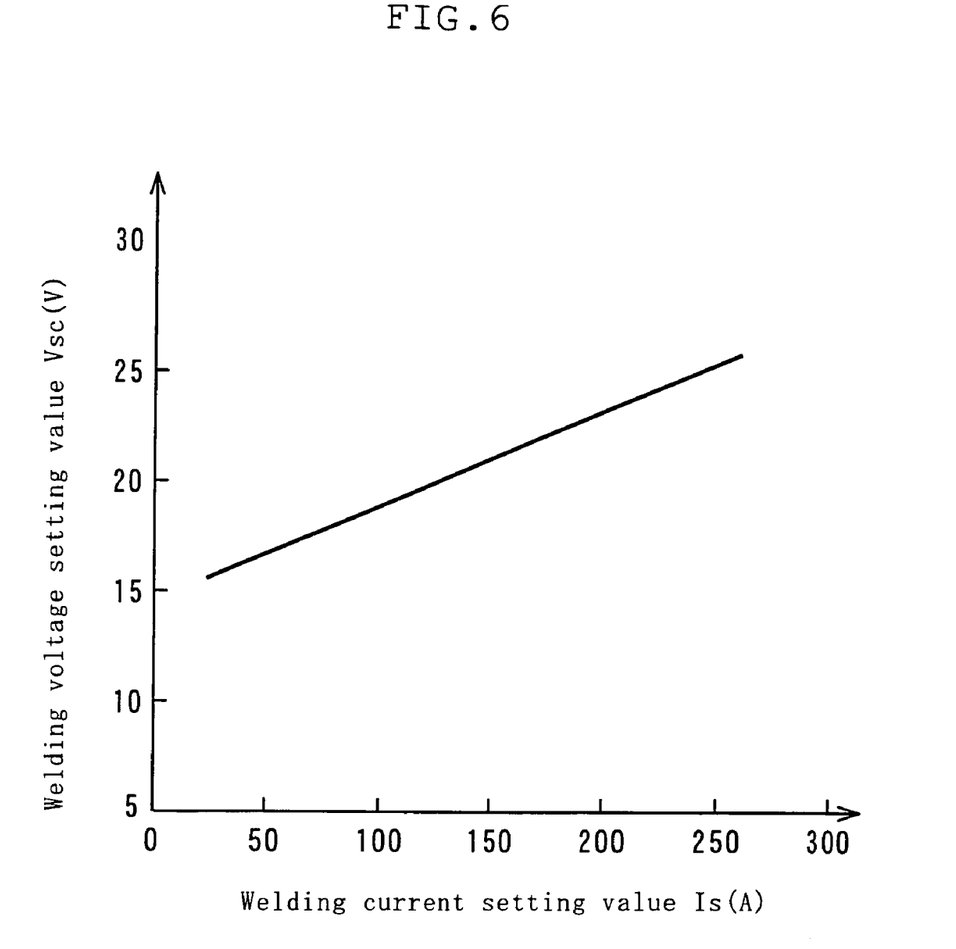
FIG. 6 illustrates an example of a one-variable voltage function used for the welder shown in FIG. 5.

FIG. 6 is a graph illustrating an example of the relationship between the welding current setting signal Is and the welding voltage setting signal Vsc. In other words, the graph illustrates an example of a voltage function. In this example, use is made of a welding wire having a diameter of 1.2 mm and made of aluminum A5356. As seen from the figure, the voltage function in this example is represented by a straight line.

With the above arrangements, it is possible to automatically determine an appropriate welding voltage setting signal Vsc based on the setting of the welding current setting signal Is. Thus, the desired welding setting can be conducted more quickly and accurately.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

The invention claimed is:

1. An AC pulse arc welding method comprising: applying a periodic welding current that includes, for a pulse cycle, negative current in electrode negative polarity and positive current in electrode positive polarity; setting a negative current rate by a negative current rate setting value, the negative current rate representing a ratio of the negative current to the welding current for the pulse cycle; and setting a feeding speed of welding wire as a consumable electrode by a feeding speed setting value; the method further comprising:

setting an average of the welding current by a welding current setting value; and performing automatic calculation of the feeding speed setting value by using a predetermined conversion function based on input of the welding current setting value and the negative current rate setting value.

2. The AC pulse arc welding method according to claim 1, wherein the negative current rate is a ratio of time integration of the negative current to time integration of the welding current for the one pulse cycle.

3. The AC pulse arc welding method according to claim 1, wherein the positive current for the one pulse cycle comprises peak current and base current.

4. The AC pulse arc welding method according to claim 1, wherein the conversion function comprises a group of functions corresponding to different negative current setting values, respectively, and wherein each function belonging to the group defines a relationship between welding current setting values and feeding speed setting values for a relevant one of the negative current setting values.

5. The AC pulse arc welding method according to claim 4, further comprising the step of setting an average voltage applied between the welding wire and a base metal by a welding voltage setting value, wherein the welding voltage setting value is automatically calculated by a predetermined voltage setting function upon input of the welding current setting value.

6. The AC pulse arc welding method according to claim 1, further comprising the step of setting an average voltage applied between the welding wire and a base metal by a welding voltage setting value, wherein the welding voltage setting value is automatically calculated by a predetermined voltage setting function upon input of the welding current setting value.

* * * * *

UNITED STATES PATENT AND TRADEMARK OFFICE
CERTIFICATE OF CORRECTION

| | |
|---|---|
| PATENT NO. | : 7,235,760 B2 |
| APPLICATION NO. | : 11/155645 |
| DATED | : June 17, 2005 |
| INVENTOR(S) | : Tong et al. |

Page 1 of 1

It is certified that error appears in the above-identified patent and that said Letters Patent is hereby corrected as shown below:

Title page, Item (73) Assignee: "Diahen Corporation, Osaka (JP)" should read --Daihen Corporation, Osaka (JP)--

Signed and Sealed this

Sixteenth Day of March, 2010

David J. Kappos
*Director of the United States Patent and Trademark Office*